Jan. 7, 1958   C. O. PETERSON   2,819,100
BEARING SEALS
Filed Jan. 10, 1955

INVENTOR.
CARL O. PETERSON
BY
Richmond J. Hayes
ATTORNEY

United States Patent Office 2,819,100
Patented Jan. 7, 1958

2,819,100

BEARING SEALS

Carl O. Peterson, Jamestown, N. Y., assignor to Marlin-Rockwell Corporation, Jamestown, N. Y., a corporation of Delaware Application January 10, 1955, Serial No. 480,895

3 Claims. (Cl. 286—5)

This invention relates to an improved seal for bearings or other relatively rotatable concentric members.

In particular, the invention is directed to the provision of a seal of the labyrinth type wherein one element of the seal is carried by the rotatable ring of a bearing and the other element of the seal, by the relatively fixed ring of a bearing. The two elements of the seal, although out of direct contact with each other, however, cooperate to provide such inter-related or interfitting portions as to retain lubricant contained within the bearing and prevent ingress of dirt or other foreign matter. It will be understood that the present illustration and description of the seal, as applied to a bearing having inner and outer rings, is intended to merely disclose one typical application of use.

It is common, in seals of this general type, to provide a pair of overlapping or inter-relating elements that are formed from metal. One of these elements is usually press-fitted into place on one of the bearing rings, the other of these elements being snapped into place in a suitable groove in the other of the bearing rings. The snapped-in element, to install, must be distorted in order to enter the groove of the bearing. Either of two results may occur by reason of this. If the seal element is formed from very thin material, it will, after installation, retain, to some extent, the deformity acquired during installation. Thus this element would not be uniformly spaced with respect to the other seal element and it is possible that a pumping action might take place, which would tend to draw foreign matter into the bearing or withdraw lubricant from the bearing. Should the snapped-in sealing element be formed from heavier gauge material for the purpose of reducing or eliminating the possibility of permanent distortion, another problem is presented. In this instance, actual tests indicate that the sealing element, when installed, either immediately or subsequently produces a slight distortion of the bearing ring in which it is mounted. This distortion may be slight or even infinitesimal. However, the bearing, as a whole, cannot be expected to function in its intended manner for any predictable length of time as a result thereof.

The present invention is directed to, and has for its primary object, the provision of a labyrinth seal for bearings, or other relatively rotatable concentric members, that during or following installation of the sealing elements there will be no distortion of the elements themselves or the bearing rings which carry them.

Another important object of the invention lies in the provision of a labyrinth seal that consists of a resilient ring, self-securing and self-sealing to one of the rings of the bearing, and a rigid metal ring that is press-fitted onto a surface of the other ring of the bearing.

A further object of the invention lies in the provision of a seal that consists of a pair of non-contacting sealing rings that, due to their inter-fitting relationship, cooperate to produce an effective barrier to the ingress of dirt or other foreign matter as well as prevent egress of lubricant from within the bearing.

Other and further objects of the invention will be more fully understood from a consideration of the following specification, taken in conjunction with the accompanying drawing, in which.

Figure 1:
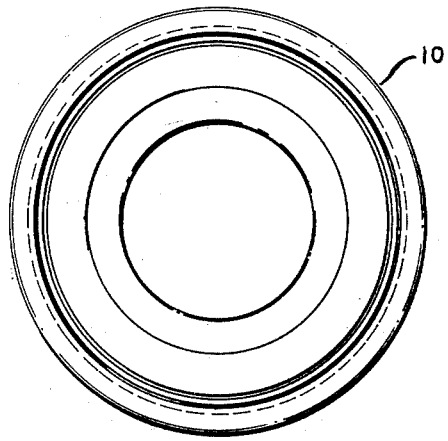
Fig. 1 is a side elevational view of a bearing fitted with sealing rings embodying one form of the invention.
Figure 2:
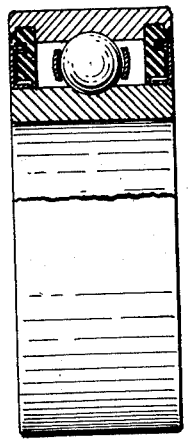
Fig. 2 is an edgewise view of the bearing shown in Fig. 1, being partly sectioned to disclose the general location of the sealing rings at each edge of the bearing.

Referring more particularly to the drawing, the reference numeral 10 is employed to generally designate a bearing in which a two-ring labyrinth seal, embodying the invention, is provided. The bearing shown includes an outer member 11 and an inner member 12. Suitable balls 13 are located in the recesses 14 and 16 of these members. The balls are held in proper relationship by means of a retainer 17; this general arrangement of bearing members, balls and retainer being common practice. Since the presently illustrated bearing 10 shows the balls 13 and retainer 17 to be exposed on two sides of the bearing, such bearing will be provided with two seals. As the seals are identical, except for their reversed position, only one will be described in detail.

The member 11, from adjacent the inner face 18 at each side of the recess 14, is radially outwardly directed to provide a shoulder 19. The outer edge of this shoulder is defined by an annular ledge 21 that faces radially inwardly. The width of this ledge is determined by a radially inwardly extending portion 22, the outer edge of which is in the plane of the vertical edge 23 of the member 11. Shoulder 19, ledge 21, and portion 22 cooperate to form an annular groove 24, substantially as shown in the drawing.

Figure 3:
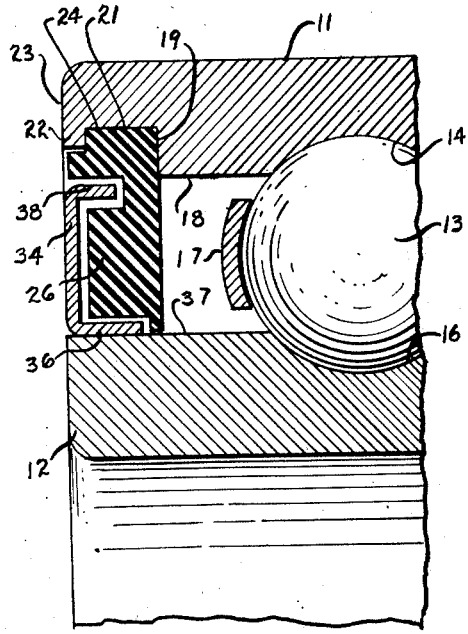
Fig. 3 is an enlarged fragmentary transverse vertical sectional view showing the mounted relationship of the inner and outer rings that constitute each seal.
Figure 4:
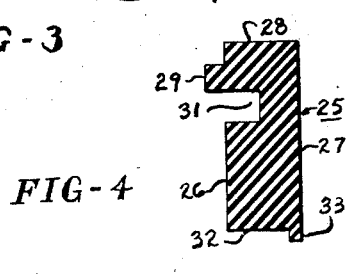
Fig. 4 is a vertical sectional view of the resilient sealing ring.

The groove 24 is intended to mount a resilient ring 25 that constitutes one of the two elements of each seal. This ring, as shown in section in Figs. 3 and 4, consists generally of a large rectangular body 26, having a substantially plane inner face 27. Extending laterally from the outer face, adjacent the outermost edge 28 is a laterally extending bead or shoulder 29. Radially inwardly from this bead is a rectangular recess 31 that extends into the body of the ring substantially to the extent shown. The inner edge 32 of this ring is flat and is terminated at one edge by a radially, inwardly directed, annular lip 33, one surface of which is in the plane of the face 27. The ring 25, to install, is compressed in order that it may be moved past the portion 22 into the groove 24. Due to the substantial proportions of the body of the ring, and the fact that it is resilient, it will expand or return to its normal shape immediately upon entering the groove and will fully seat and fill the groove and create a fluid-tight seal as between it and the outer member 11. It will be noted that the inner lip of the ring, when mounted, is not in physical contact with the outer surface of the inner member 12, but is in such proximity thereto as to provide what is well known as a fluid seal therebetween.

The other element of the seal 34 is formed from metal and is commonly known as a flinger ring. The inner edge of this ring is defined by a flange 36 that is at right angles to the body of the ring. This flange is press-fitted onto the outer surface 37 of the inner ring 12. The outer circumferential edge of this ring is defined by an inwardly extending annular flange 38. The ring 34, when press-fitted onto the inner member 12 of the bearing, provides, in cooperation with the bead 29, an almost continuous closure between the co-planar edges of the outer and inner bearing members 11 and 12, respectively.

When the sealing rings have been mounted as described, it will be noted that a narrow laybrinth clearance is provided. The clearance is such that, when the bearing members are relatively rotated, the sealing rings will not be in rubbing contact. However, this labyrinth is of insufficient width to permit the passage of lubricant from within the bearing, outwardly to its exterior. As a matter of fact, centrifugal force, during relative rotation of the bearing members, will cause he lubricant within the bearing to crowd toward the outer bearing ring and the adjacent portion of the resilient sealing ring 25. Since the fit of this sealing ring with the outer bearing member is fluid-tight, none of the fluid within the bearings can escape. Also, the body of the flinger ring 34 provides, with the bead 29, a substantially continuing barrier to the ingress of dirt or other foreign matter through the labyrinth formed by the seal.

It is pointed out that, due to the substantial proportions of the resilient ring 26, there will be no tendency of the outer member 11 to distort and, consequently, the relatively rotatable sealing rings will at no time come into contact with each other, thus eliminating any drag to the normal functioning of the bearing. Any slight variance in the width of the labyrinth that may possibly occur is negligible and will have no effect whatsoever on the ability of the seal to prevent egress of lubricant or ingress of dirt.

Figure 5:
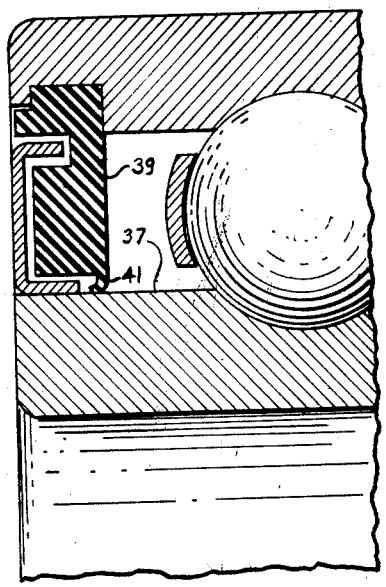
Fig. 5 is a view similar to Fig. 3 showing a slight modification of a portion of the resilient sealing ring.

Reference is now had to Fig. 5 of the drawing. The bearing members 11 and 12, balls 13, and retainer 17 are identical with the corresponding structure previously described. Also, the flinger ring is identical with the ring 34. The resilient ring 39 in this modification, instead of showing the annular lip 33, provides a narrow, elongated lip 41. The lip 41 is intended to contact or lap the surface 37 of the inner member 12, substantially as shown. Due to the narrowness of this lip, its contact with the surface 37 is insufficient to create any measurable drag to relative rotation of the bearing members. This lip, however, does serve to completely eliminate any possibility of egress of lubricant from within the bearing while the members are relatively rotating or while they are at rest.

Although applicant has shown and described only one general form of the invention and a slight modification of a part of the resilient ring of the seal, it will be understood that variations in the structure of the sealing rings, to adapt them to bearings other than the one shown, may be made and are contemplated as being within the scope of the invention insofar as such variations are encompassed by the annexed claims.

Having thus set forth my invention, what I claim as new and for which I desire protection by Letters Patent is:

1. A seal adapted to span the space between a pair of relatively rotatable concentric members, one of said members having a marginally located annular recess radially facing the other of said members, said seal comprising a resilient ring, an annular portion of said ring conforming to and fitting the walls of said recess under radial pressure, the body of said ring extending radially into lubricant sealing proximity with the other of said members, said body having axially opening recesses, one of which being formed in part by said other member, a metal ring fixed to said other member, flanges on said metal ring projecting into said recesses, said metal ring in its entirety having such proximity with said resilient ring as to provide a seal against displacement of lubricant from the space between said members.

2. A seal adapted to span the space between a pair of relatively rotatable concentric members, one of said members having a marginally located annular recess radially facing the other of said members, said seal comprising a resilient ring, an annular portion of said ring conforming to and fitting the walls of said recess under radial pressure, the body of said ring being of substantial thickness and extending radially into lubricant sealing proximity with the other of said members, said body having axially opening recesses, one of said recesses being of greater depth than the other, a metal ring fixed to said other member, said metal ring having flanges of unequal length, said flanges projecting into said recesses to an extent to cause said metal ring, in its entirety, to have such proximity with said resilient ring as to provide a seal against displacement of lubricant from the space between said members.

3. A seal adapted to span the space between a pair of relatively rotatable concentric members, one of said members having a marginally located annular recess radially facing the other of said members, said seal comprising a resilient ring, an annular portion of said ring conforming to and fitting the walls of said recess under radial pressure, the body of said ring extending radially into lubricant sealing proximity with the other of said members, said body having a pair of axially opening recesses radially spaced apart, the outermost of said recesses being formed entirely in said body, the innermost of said recesses being formed in part by said other member, a metal ring fixed to said other member, said metal ring having a pair of axially extending flanges radially spaced apart, the radially outward flange of said metal ring projecting into the outermost of said recesses, the radially inward flange of said metal ring projecting into the innermost of said recesses, said metal ring and said seal having such proximity as to effect a seal against displacement of lubricant from the space between said members.

References Cited in the file of this patent

UNITED STATES PATENTS

| 1,226,240 | Murphy | May 15, 1917 |
|---|---|---|
| 2,152,444 | Searles | Mar. 28, 1939 |
| 2,275,325 | Searles | Mar. 3, 1942 |
| 2,591,129 | Brouwer | Apr. 1, 1952 |
| 2,690,937 | Leister | Oct. 5, 1954 |

FOREIGN PATENTS

| 1,016,155 | France | Aug. 20, 1952 |